Patented Aug. 22, 1950

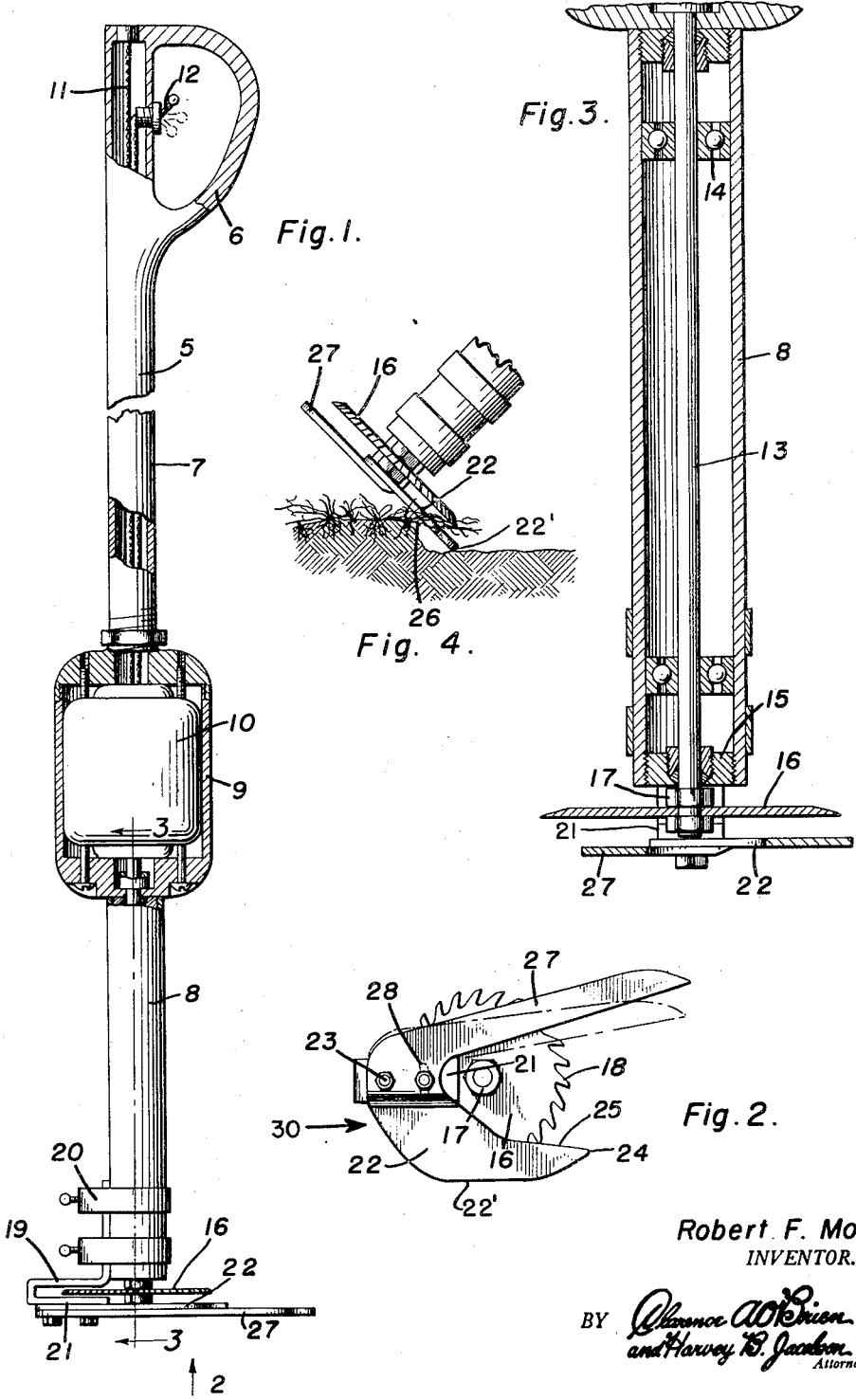

2,519,779

UNITED STATES PATENT OFFICE 2,519,779

LAWN TRIMMER

Robert F. Moon, Oklahoma City, Okla.

Application December 9, 1948, Serial No. 64,334

2 Claims. (Cl. 56—25.4)

The present invention relates to new and useful improvements in lawn trimmers designed primarily for use in trimming grass along the edges of a lawn.

An important object of the invention is to provide a power operated lawn trimmer including a handle having a rotary cutter mounted at its outer end and providing a pick-up shoe or guard which travels over the ground below the lower edge of the cutter to pick up low growing runners or roots to feed the same to the cutter.

A further object of the invention is to provide an adjustable guard for the cutter and including an upper vertically swingable guard arm positioned adjacent the upper edge of the rotary cutter to prevent the grass and runners from becoming entangled with the cutter or with the drive shaft thereof.

Another object of the invention is to provide a lawn trimmer including an elongated handle having an electric motor mounted therein for driving the rotary cutter at the lower end of the handle.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts broken away and shown in section;

Figure 2 is an end elevational view showing the grass pick-up shoe and guard positioned outwardly of the rotary cutter;

Figure 3 is an enlarged fragmentary longitudinal sectional view taken on a line 3—3 of Figure 1, and Figure 4 is a fragmentary side elevational view showing the trimmer in operating position.

Referring now to the drawings in detail wherein for the purpose of illustration I have disclosed a preferred embodiment of the invention, the numeral 5 designates a hollow handle preferably constructed of light weight metal or other suitable material and having a hand-grip 6 at its upper end. The handle 5 includes an upper section 7 and lower section 8 with a motor housing 9 connected between the adjacent ends of the upper and lower sections.

An electric motor 10 is suitably secured in the housing 9 and is connected with a suitable source of current by means of circuit wires 11 leading from the motor through the upper handle section 7. A switch 12 is provided for the motor adjacent the hand-grip 6.

A shaft 13 is driven from the lower end of motor 10 and is journaled in ball bearing assemblies 14 suitably secured in the lower section 8 of the handle. The lower end of lower handle section 8 is closed by a threaded plug 15 in which the shaft 13 is also rotatably supported, and to the outer end of the shaft is secured a rotary cutter 16 by means of nuts 17 threaded on the shaft.

The cutter 16 may be of any suitable construction and in its present embodiment includes a toothed cutting edge 18.

A bracket 19 is secured to the lower end of the lower section 8 of the handle by means of one or more clamping collars 20, the outer end of bracket 19 extending inwardly at the outer surface of cutter 16 to provide an arm 21 to which one end of a ground engaging pick-up shoe, or arm, 22 is secured by bolts or the like 23.

The pick-up shoe is of a flat construction positioned parallel to cutter 16 and is curved downwardly from arm 21 with its lower edge 22' adapted to be postioned below the cutter 16 to rest on the ground when the cutter 16 is in operation. The outer end of pick-up arm 22 is pointed as shown at 24 and the upper edge of the pick-up arm slopes inwardly as shown at 25 to pick up grass and runners at the edge of a lawn as shown at 26 in Figure 4 of the drawings to feed the same to the cutter 16.

A guard arm 27 is also secured to the arm 21 by the bolts and nuts 23 engaged in slots 28 at the inner end of arm 27 to adjust the arm 27 toward of from the pick-up arm 22.

The outer end of guard arm 27 projects beyond pick-up arm 22 and forms therewith a substantial V-shape guard 30, and guard arm 27 also engages grass and runners to feed the same to the cutter and to prevent the runners from becoming entangled with the cutter 16 and shaft 13.

In the operation of the device, the handle 5 is held in an inclined position to move the cutter forwardly along the edge of a lawn with said cutter 16 inclined over said edge in a manner as shown in Figure 4 and so that the lower edge 22' of the shoe, or arm, 22 slides along the ground to pick up low growing grass or runners which lie close to the surface of the ground. The inclined inner edge 25 of the pick-up shoe feeds such runners to the cutter.

The guard arm 27 may be raised or lowered with respect to pick-up shoe, or arm, 22 in accordance with varying conditions and type of grass being trimmed.

In view of the foregoing description taken in conjunction with the accompanying drawings it its believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A lawn trimmer comprising an elongated handle having an upper hand grip end, a power operated shaft journaled in said handle, a rotary cutter connected to said shaft at the lower end of said handle for forward movement by said handle along one edge of the lawn with said cutter inclining over said edge when said trimmer is in operating position, and a V-shaped guard for said cutter positioned beneath the same and including pick-up and guard arms, respectively, one adjustable toward or from the other, the pick-up arm having a lower ground engaging edge, the guard arm inclining upwardly and forward of the pick-up arm and both arms extending forwardly of the cutter when said trimmer is in operating position.

2. A lawn trimmer comprising an elongated handle having an upper hand grip end, a power operated shaft journaled in said handle, a rotary cutter connected to said shaft at the lower end of said handle for forward movement by said handle along an edge of the lawn with said cutter inclining over said edge when said trimmer is in operating position, and a V-shaped guard for said cutter positioned beneath said cutter and including a pick-up arm and a guard arm, said pick-up arm being of flat form with a ground engaging edge and a pick-up edge inclining inwardly of said guard toward said guard arm, said pick-up and guard arms extending forwardly of said cutter when said trimmer is in operating position.

ROBERT F. MOON.

REFERENCES CITED

The following references are of record in the file of this patent:

UNITED STATES PATENTS

| Number | Name | Date |
|---|---|---|
| 1,871,606 | Haddad | Aug. 16, 1932 |
| 2,134,609 | Hay | Oct. 25, 1938 |
| 2,263,431 | White | Nov. 11, 1941 |
| 2,295,072 | Blessing | Sept. 8, 1942 |